C. O. ROGERS.
COMBINED HAND RAIL AND WATER GAGE.
APPLICATION FILED MAY 21, 1918.
1,281,663.
Patented Oct. 15, 1918.
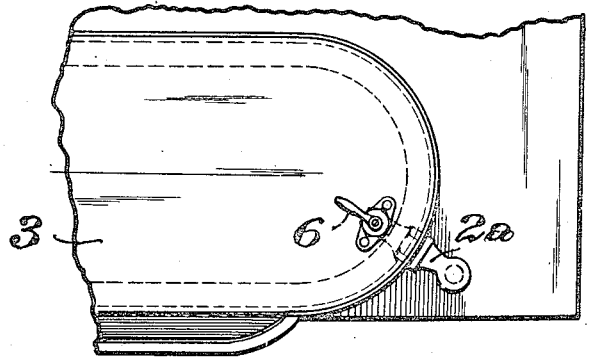
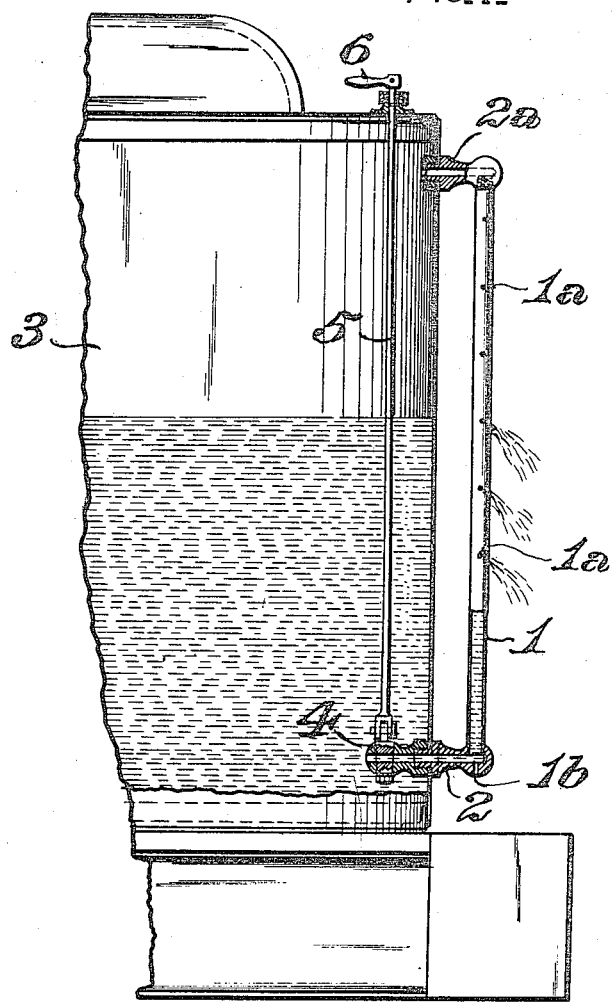

UNITED STATES PATENT OFFICE.

CAMPBELL O. ROGERS, OF TROY, NEW YORK.

COMBINED HAND-RAIL AND WATER-GAGE.

1,281,663.  Specification of Letters Patent.  Patented Oct. 15, 1918.

Application filed May 21, 1918.  Serial No. 235,838.

*To all whom it may concern:*

Be it known that I, CAMPBELL O. ROGERS, of Troy, in the county of Rensselaer and State of New York, have invented a certain new and useful Improvement in Combined Hand-Rails and Water-Gages, of which improvement the following is a specification.

My invention relates, generally, to means for approximately indicating the level of fluid in a tank or other reservoir, and more particularly to appliances of such type designed for application to the water tank of a locomotive engine, and its object is to effect, by a simple and inexpensive construction, the utilization of an ordinarily existing member of a locomotive tender, for the performance of this function, in addition to its usual and normal one.

The improvement claimed is hereinafter fully set forth.

In the accompanying drawing: Figure 1 is a vertical longitudinal section through the forward portion of the tank of a locomotive tender, and; Fig. 2, a plan or top view of the same.

In the practice of my invention, referring descriptively to the specific embodiment thereof which is herein exemplified, I provide a substantially vertical metal gage tube, 1, which is connected, at or near its lower end, by a tubular coupling, 2, with the water tank, 3, of a locomotive tender. The upper end of the gage tube is connected to the tank by a coupling, 2ª, which may either be tubular or solid, and in the latter case, an opening should be formed in it to establish communication between the interior of the gage tube and the atmosphere. The gage tube, 1, is, preferably, as shown, located sufficiently far from the tank to enable it to be grasped by an operator in getting on or off the locomotive, and in the position occupied by the ordinary hand rail which is applied to facilitate ingress and egress to and from the locomotive cab and the tender, and, when so located, performs the function of said hand rail, in addition to that of a gage tube. A plurality of small perforations or vents, 1ª, is formed in the gage tube, at desired and determined intervals in its length; which intervals may be less or greater, according to the degree of approximate accuracy of indication of the level of the water in the tank which may be desired.

The coupling, 2, of the lower end of the gage tube, may be opened and closed, as from time to time desired, to admit water from the tank to the gage tube, for obtaining indications of water level, by a cock or valve, 4, connected to a rod, 5, which extends upwardly, to and through the top of the tank, and carries a handle, 6, on its upper end, located within convenient reach of the engineman and fireman. In order to prevent liability to freezing, a small drain hole, 1ᵇ, is formed at the bottom of the gage tube, to allow all water to escape therefrom when not under observation as an indicator.

The advantage of my invention as compared with indicators of the type in which a float or a glass sight tube is applied, will be obvious to those familiar with the conditions of locomotive operation, and as the appliance can be substituted for the ordinary tender hand rail, its application is easy and inexpensive.

I claim as my invention and desire to secure by Letters Patent:

1. The combination, with a locomotive tender tank, of a vertical tubular metal hand rail supported from the wall of the tank at its top and bottom, the support at the bottom of the rail having a passage therethrough putting the tank water space in communication with the inside of the rail, a valve in said passage to control such communication, and means operable at the top of the tank to actuate said valve, said rail having a plurality of vents disposed at regular intervals throughout its length.

2. The combination, with a locomotive tender tank, of a tubular hand rail connected thereto, a tubular connection from the inside of the tank to the inside of the rail near the bottom of the latter, a valve in said connection, a rod to actuate said valve extending above the top of the tank, and a handle on the upper end of said rod, said rail having an air vent at its top, a drain vent at its bottom, and a plurality of vents disposed at intervals throughout its length.

CAMPBELL O. ROGERS.

Witnesses:
J. SNOWDEN BELL,
EDWARD A. WRIGHT.